F. WALTON.
Machine for Making Plastic Floor-Cloth.

No. 168,199. Patented Sept. 28, 1875.

Witnesses
Jas. S. Wightman
W. L. Dennis

Inventor
Frederick Walton
by his atty
E. S. Renwick

F. WALTON.
Machine for Making Plastic Floor-Cloth.
No. 168,199.  Patented Sept. 28, 1875.
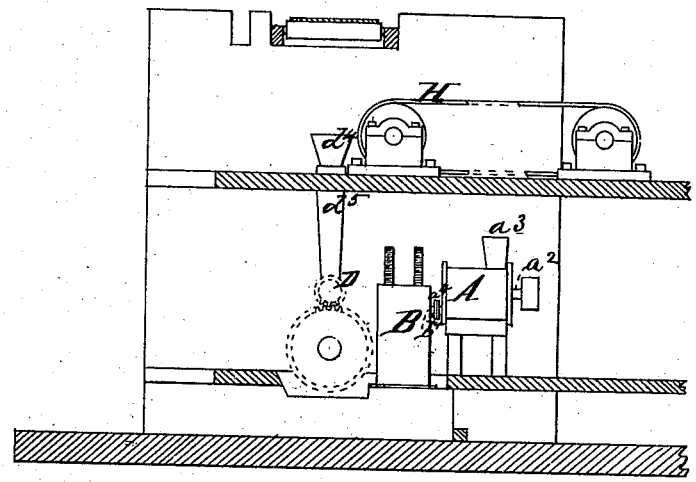
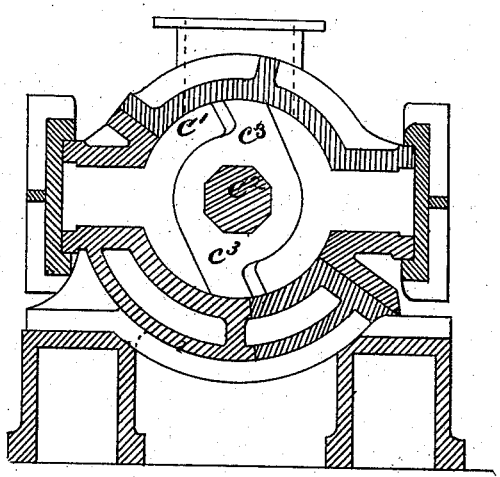
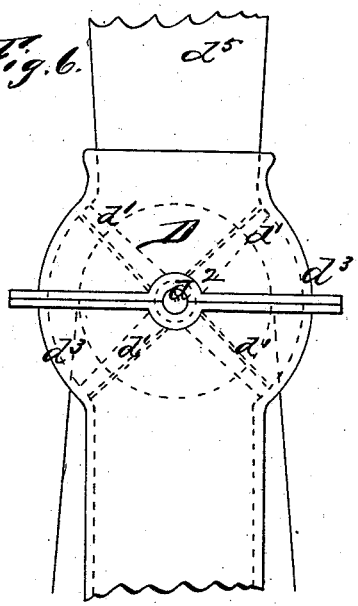

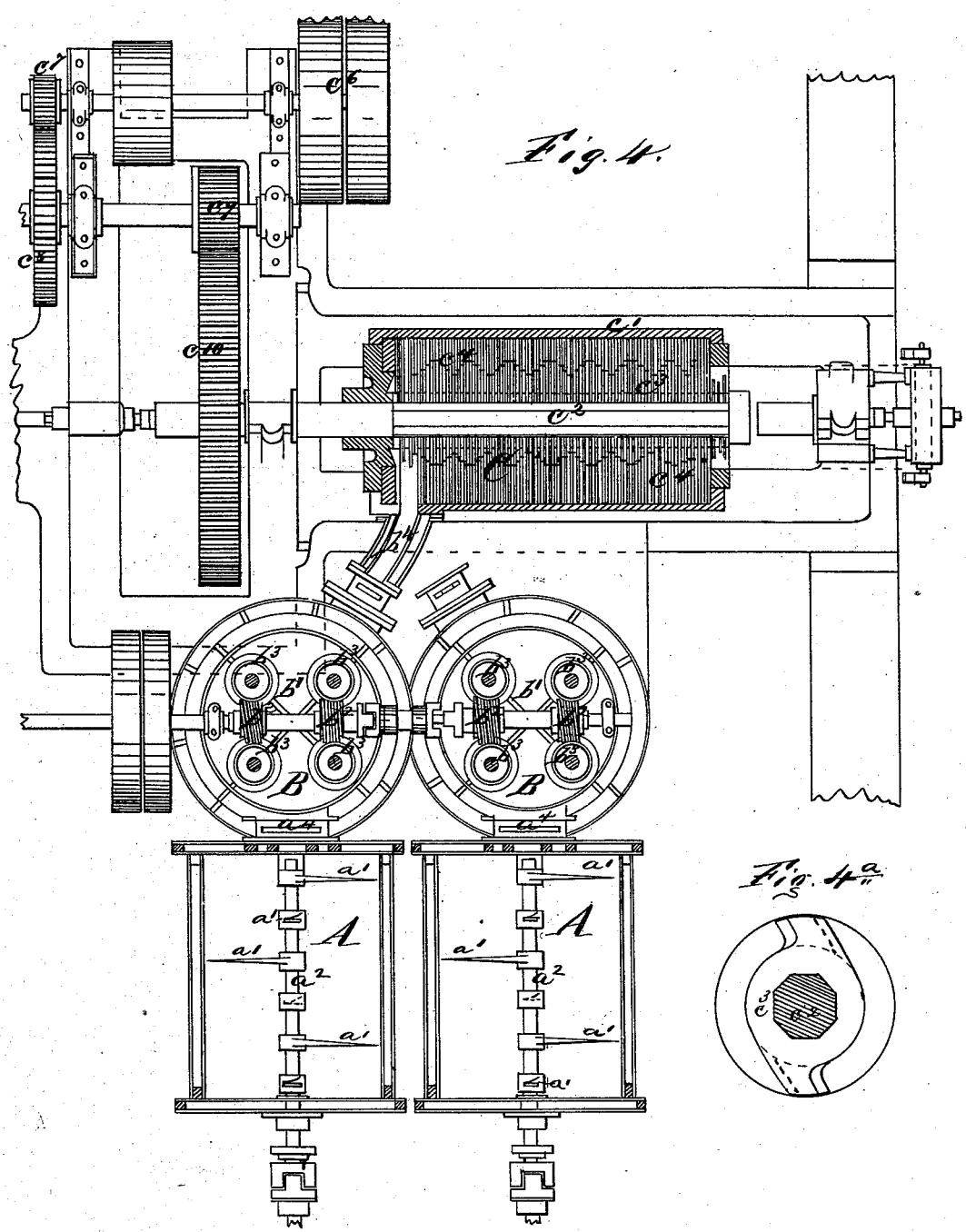

UNITED STATES PATENT OFFICE.

FREDERICK WALTON, OF STAINES, GREAT BRITAIN, ASSIGNOR TO THE AMERICAN LINOLEUM MANUFACTURING COMPANY, OF NEW YORK, N. Y.

IMPROVEMENT IN MACHINES FOR MAKING PLASTIC FLOOR-CLOTH.

Specification forming part of Letters Patent No. 168,199, dated September 28, 1875; application filed August 21, 1875.

*To all whom it may concern:*

Be it known that I, FREDERICK WALTON, of Staines, in the county of Middlesex and Kingdom of Great Britain, have made an invention of certain new and useful Improvements in Machinery for the Manufacture of Floor-Cloths, and other articles made of plastic materials, and that the following is a full, clear, and exact description and specification of the same.

This invention has reference more particularly to the manufacture of floor-cloths from a plastic composition of gums or resins and a powdered or fibrous material; and its objects are to enable the manufacture to be prosecuted with a small amount of hand-labor, and to insure uniformity in the proportions of the component parts of the plastic composition. To these ends the invention consists of certain new arrangements of the machinery by which the component parts of the plastic composition are combined, mixed, kneaded, and reduced to sheets and spread, if necessary, upon a textile fabric.

These arrangements are recited in detail at the close of this specification, and in order that they may be fully understood, I have represented in the accompanying drawings, and will proceed to describe, the machinery embodying those arrangements which I have used with success in the manufacture of linoleum floor-cloths.

Figure 1:
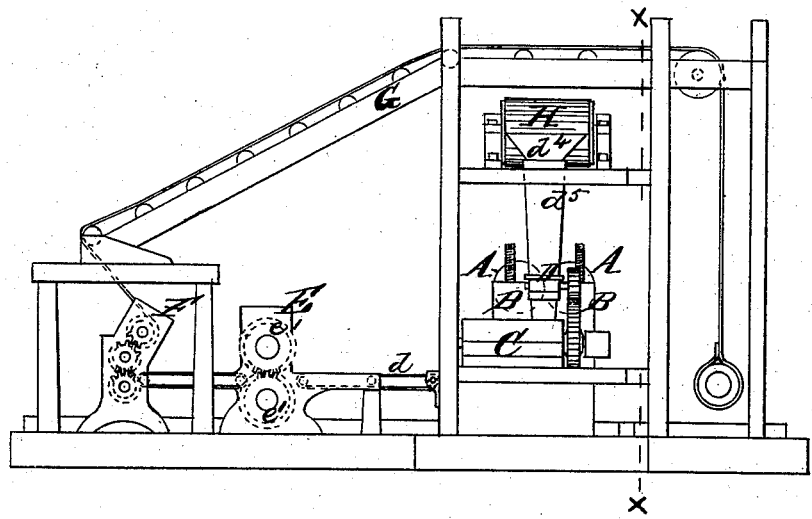
Figure 2:
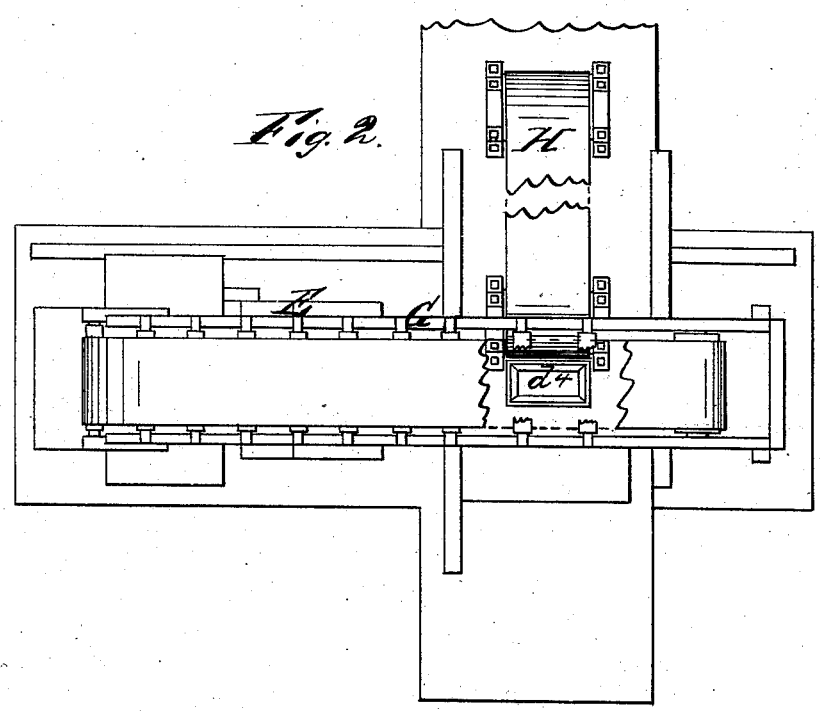

In said drawings, Figure 1 represents a side view of said machinery. Fig. 2 represents a plan of the same. Fig. 3 represents a transverse section of the same at the line $xx$ of Fig. 1. Figs. 4, 4$^a$, 5, and 6 represent sections upon a larger scale of certain parts of the mechanism which are designated by the same letters as they are designated by in the other figures.

The principal members of my arrangements are the following, viz: A cement pan, by means of which the gummy and resinous materials employed in the manufacture are heated and mixed, so as to produce a cement—two of these cement-pans are employed, by preference, so that the work may go on without interruption; a receiver, which receives the cement from the cement-pan and delivers it in regulated quantity to the mixing-machine or mixer; a meter, for delivering the powdered material to the mixer in regulated quantities; a mixing-machine or mixer, for thoroughly mixing and kneading the cement and the powdered material, and for delivering the plastic composition produced thereby; a breaking-machine, consisting, by preference, of a pair of large rolls for operating upon the mass of composition delivered from the mixer, and for transforming it into a slab; a calender-machine, for reducing to a sheet the slab of composition delivered by the breaking-machine, and for combining the sheet with a sheet of textile fabric, if required.

The construction of the above members may be varied, as circumstances render expedient, the peculiar construction of each not constituting a characteristic of my invention.

In the machinery represented in the accompanying drawings two cement-pans, A A, are employed. Each of these cement-pans is a horizontal cylinder or vessel, containing inclined stirrers $a^1$ mounted upon a shaft, $a^2$, which is driven at a slow speed in any convenient manner. The cement-pan is steam-jacketed at the lower part, and is provided with a hopper, $a^3$, through which it is fed. When the mixture or cement has been prepared a door, $a^4$, at the end of the cement-pan, is opened, and the stirrers drive the material out into an upright receiver, B, of a cylindrical form. There are two such cement-pans and receivers employed. The receivers are steam-jacketed, and they contain pistons $b^1$, which can be forced downward by the worms $b^2$ and pinions $b^3$, working as nuts upon the piston-rods, which have screw-threads cut upon them. The shafts of the worms $b^2$ can be rotated in either direction by means of driving-straps. The piston $b^1$, when it descends, causes the cement to be delivered through a steam-jacketed pipe, $b^4$, into a powerful mixing-machine, C, where ground cork is worked up with it to form the linoleum compound.

By working the two receivers B B alternately the cement is delivered continuously, or nearly so, and at uniform speed, into the mixing-machine C. A proportionate quantity of ground cork is also continuously delivered into the barrel of the mixing-machine by means of the meter D.

The mixing-machine consists of a barrel, $c^1$, with a shaft, $c^2$, passing through it. These parts are shown in section at Fig. 5. The shaft $c^2$ is of octagonal form, and it is covered from end to end of the barrel with rings $c^3$, equally spaced by means of washers placed between them. Each ring has two cutters formed upon it, as shown at Fig. 4$^a$. These rings and cutters are all similar, the one to the other, and the cutters are arranged spirally around the shaft $c^2$, with the washers between them to maintain spaces or intervals of the same width as the teeth, or thereabout. There are also two rows of cutters, $c^4$, fixed within the barrel. They are similarly spaced, one row on each side, and the cutters $c^3$ upon the shaft pass between them. The lower part of the barrel is steam-jacketed. The axis of this mixing-machine is driven at a low speed through spur-wheels, and the materials, when thoroughly mixed, are delivered in a plastic state at the open end of the barrel onto a traveling apron, $d$. The shaft $c^2$ of the mixing-machine is so arranged that it can be accurately adjusted and retained in position in a longitudinal direction, so that the cutters may not come in contact the one with the other, although passing each other with very little clearance. At one end the thrust of the shaft is taken upon a hardened steel pin, supported by a standard provided for the purpose, and the pin is adjustable by means of nuts on a screw-thread cut upon it. The other end of the shaft is somewhat similarly supported and adjusted, as the drawing shows. $c^6$ are driving-pulleys, which receive the driving-belt, by which motion is given to the mixing-machine. Upon the shaft of these pulleys is a pinion, $c^7$, gearing with a spur-wheel upon the intermediate shaft $c^8$, on which is the pinion $c^9$, driving the spur-wheel $c^{10}$ fixed upon the shaft $c^2$.

The meter D, by means of which the pulverulent material is measured, consists of cross-arms $d^1$, Fig. 6, mounted upon a shaft, $d^2$, and contained within a cylindrical case, $d^3$. It is driven by a band passing around a pulley secured to its shaft. It delivers the cork down a trunk into the barrel of the mixer, at a point immediately over that at which the cement enters.

The ground cork which I have used as the powdered material may be prepared in any convenient way, that which I prefer being to first break the slabs of cork into coarse granules, and then to grind or rasp these to powder.

The breaking may be done by means of a pair of rollers whose barrels are formed with screw-threads having cutting-edges.

The rasping may be done by feeding the granules to a mill having a pin-studded cylinder revolving in an iron barrel; or one having a gang of circular saws revolving in an iron barrel, the same as a machine for reducing die-woods to powder.

The cork powder should be conveyed from the cork-mill by means of a conveyer, H, and delivered into the hopper $d^4$ of the powder-feeder $d^5$, at whose lower end the meter D is arranged.

The members of the mechanism thus far described are arranged as represented in the drawings, so that each cement-pan A discharges into a receiver, B, that the receiver discharges into the mixer C, and that the meter D delivers the powder into the end of the mixer at which the cement is received.

The rate at which the cement is delivered, and consequently its proportion in the composition, is determined by the speed at which the worms $b^2$ are driven for the purpose of forcing the pistons down in the receiver and ejecting its contents. On the other hand, the rate at which the powdered cork is delivered, and consequently its proportion in the composition, is determined by the speed at which the shaft of the meter is turned.

The delivery-pipe $b^4$, which connects the receiver with the mixer, is transferable from one receiver to the other, so that the two receivers may be alternately connected with the mixer, and thus a practically constant supply of the cement may be delivered to the mixer.

The breaker E is arranged to receive the mass delivered from the mixer. It consists of a pair of large steam-heated rolls, $e'$ $e'$, driven at a slow speed. The mass of composition delivered by the mixer is fed between these rolls, and is by them reduced to a continuous slab.

The calender-machine F is arranged next to the breaker, so that the slab formed by the latter may pass to the calender-rolls. The calender-machine is of the same construction as those used in the manufacture of sheet rubber, and its rolls are steam-heated. It receives the slab from the breaker, and reduces it to a sheet of the thickness required for floor-cloths. If the sheet is to be applied to a backing of cloth, the latter is fed to the calender-machine, and has a coating of waterproof composition applied in the calender to that face of it to which the sheet of plastic composition is to be applied. The waterproof composition which I have employed consists of linoleum dissolved in naphtha, and is semi-fluid. The slab is conveyed from the breaker to the calender by means of an endless belt or apron of cloth or wire-gauze, supported upon and caused to move by means of rollers, and the mass of composition is conveyed from the mixer to the breaker by means of a similar belt or apron supported upon and driven by rollers. The sheet delivered from the calender is conducted up an incline, G, formed of supporting-rollers, to the top of the drying-room, in which it is to be suspended until it is printed. In its passage up the incline it is exposed to air, which cools it.

The several members thus described are all combined by means of pulleys, belts, and shafting, whereby they are put in motion by the same motor, so that their relative speeds when once adjusted remain the same. The adjustment of the speed of the powder-meter may be made by means of cone-pulleys, so as to vary the quality of the composition. Cone-pulleys may also be employed to vary the speeds of the breaker and the calender. The members thus combined constitute a connected train of combined machines for compounding the cement and powder, so as to produce the composition; breaking it down so as to transform it into a slab, and reducing the slab into a sheet of the desired thickness. The results are the production of sheets of composition of practically uniform quality, with the least expenditure of hand-labor.

In some cases, depending upon the greater or less fusibility of the materials used for making the cement, the cement-pans may be dispensed with, and the materials are then introduced directly into the receiver or receivers, which, being steam-jacketed, heat the materials sufficiently to enable them to be fed to the mixter and mixed thereby. In some cases, also, depending upon the greater or less plasticity of the compound, the breaker may be dispensed with. In such case the material from the mixer is delivered directly to the calendar, and rolled thereby into a thin sheet.

I claim as my invention—

1. The arrangement relatively to each other, substantially as before set forth, of the cement-pan, the receiver, and the mixer, whereby the cement is compounded and delivered to the mixer in regulated quantities.

2. The arrangement relatively to each other, substantially as before set forth, of the powder-meter, the receiver, and the mixer, whereby the cement and powder are mixed in definite proportions.

3. The arrangement relatively to each other, substantially as before set forth, of two receivers and one mixer, whereby a continuous supply of cement is fed and mixed.

4. The arrangement relatively to each other, substantially as before set forth, of two cement-pans, two receivers, and one mixer, whereby a continuous supply of cement can be compounded and fed to the mixer.

5. The arrangement relatively to each other, substantially as before set forth, of the receiver, the powder-meter, the mixer, and the calender, whereby the materials are mixed in definite proportions and delivered in a thin sheet.

6. The arrangement relatively to each other, substantially as before set forth, of the cement-pan, the receiver, the powder-meter, the mixer, and the breaker, whereby the materials of the composition are compounded, mixed in definite proportions, and formed into a slab.

7. The arrangement relatively to each other, substantially as before set forth, of the cement-pan, the receiver, the mixer, the powder-meter, the breaker, and the calender, whereby the materials are mixed in definite proportions, and the composition thereby produced is delivered in a thin sheet.

Witness my hand this 8th day of June, A. D. 1875.

FREDERICK WALTON.

Witnesses:
  WILLIAM JOHN HORTON,
    *Clerk, 4 Fell St., London.*
  EDWARD NICHOLSON,
    *Merchant, 4 Fell St., London.*